United States Patent Office 3,139,149
Patented June 30, 1964

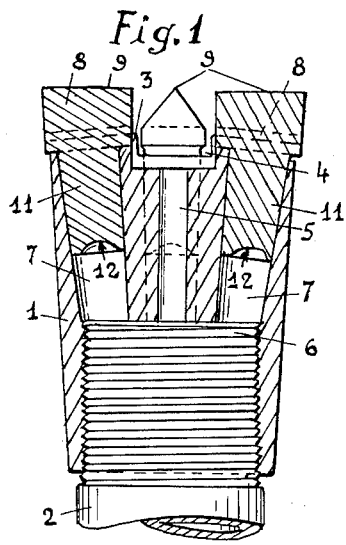
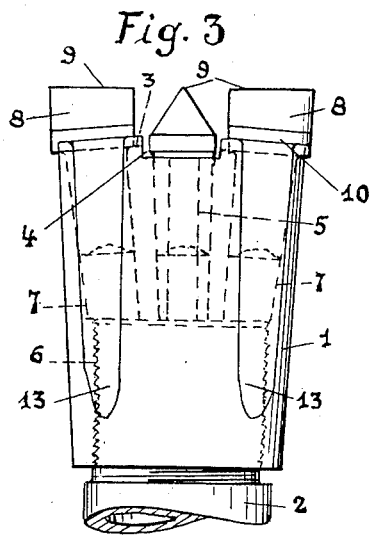
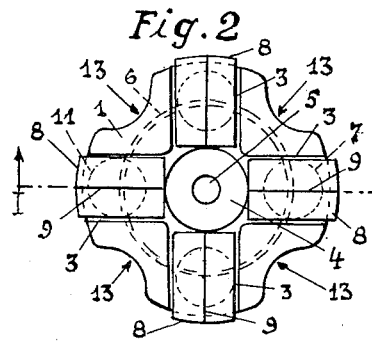
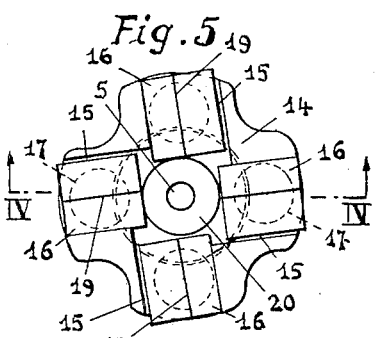
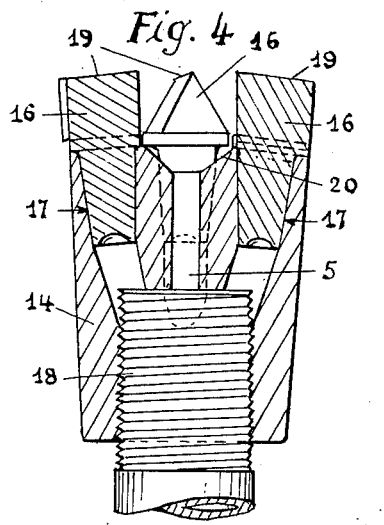
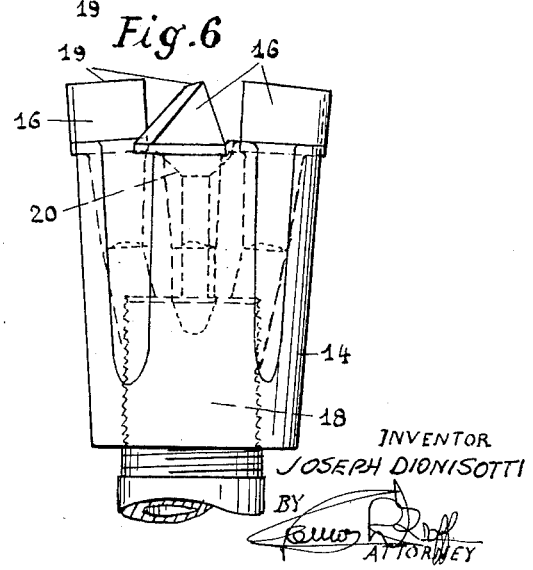

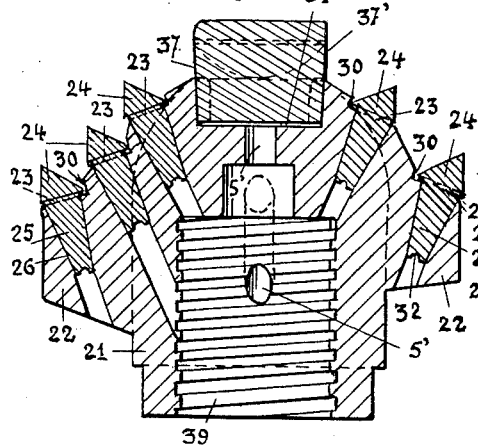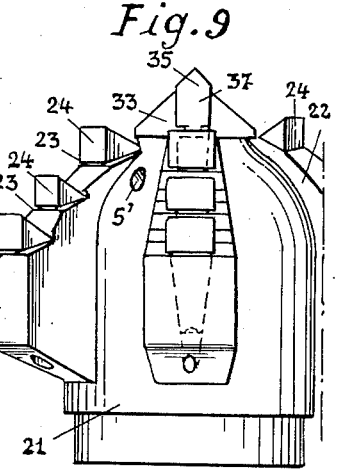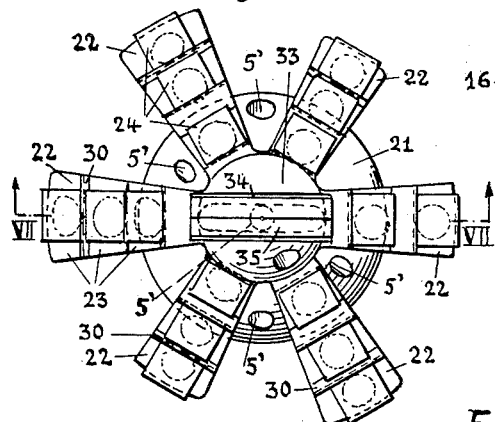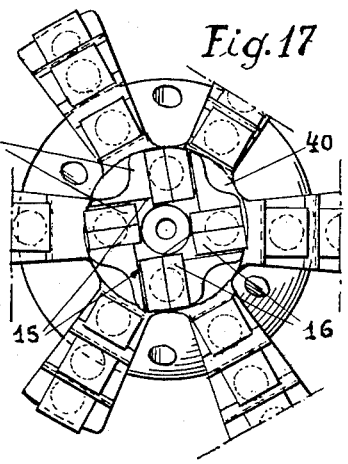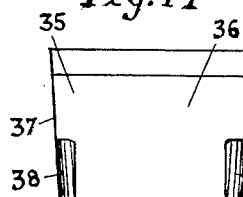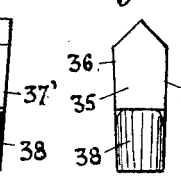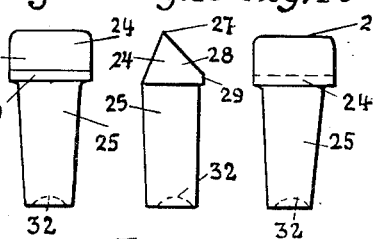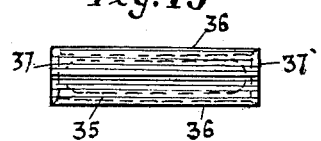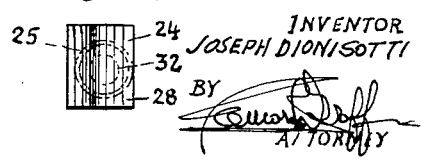

3,139,149
ROCK DRILLING TOOL
Joseph Dionisotti, Monthey, Valais, Switzerland
Filed Mar. 28, 1960, Ser. No. 18,083
Claims priority, application Switzerland Mar. 31, 1959
2 Claims. (Cl. 175—413)

The present invention relates to an improvement in rock drilling tools.

One of the objects is to provide a tool constituted by a bit of general circular shape, the said bit being provided on its surface with a series of cross slots in each of which is housed, in the exact operating position, a removable and interchangeable cutter insert whose base is constituted by a shank housed in a related tapered bore whose cross section corresponds to that of the bit. The said shank of each bit is provided at its lower end with a cup for centering a punch, said cup being accessible through the open inner end of the bore leading to the threaded attaching socket to enable the bit to drive the shank out of its housing. Said bit is further provided with at least one inner duct for blowing air, and, on its periphery, with at least one longitudinal groove for the discharge of drilling waste, the whole arranged in such a way that the inserts are capable of being suitably inserted in any one of the bores of the bit and withdrawn from their housing by being driven out by the punch.

The accompanying drawing shows two embodiments and two modifications of the drilling tool by way of example.

FIGS. 1, 2 and 3 show a first embodiment of a bit with four inserts disposed cross shaped at the head of the bit; FIG. 1 is a sectional view in elevation along line I—I of FIG. 2; FIG. 2 is a plan view; and FIG. 3 is a side view.

FIGS. 4 to 6 show a modification of the first embodiment of the bit with four inserts in an offset position; FIG. 4 is a sectional view in elevation along line IV—IV of FIG. 5; FIG. 5 a plan view, and FIG. 6 a side view.

FIGS. 7 to 9 show a second embodiment of the bit, provided with six arms disposed in the shape of a star, each of the arms comprising tiered inserts, and the head of the bit being provided with a rectilinear insert of trapezoidal shape; FIG. 7 is a sectional view in elevation along line VII—VII of FIG. 8; FIG. 8 is a plan view of FIG. 7, and FIG. 9 a partial side view.

FIGS. 10 to 13 show a removable and interchangeable insert for the bit; FIG. 10 is a view in elevation of the front face of the cutting edge; FIG. 11 is a side view; FIG. 12 is a plan view of FIG. 11; and FIG. 13 is a view in elevation of the rear face of the cutting edge.

FIGS. 14 to 16 show an insert for the head of the bit shown in FIGS. 7 to 9, FIG. 14 is a view in elevation; FIG. 15 is a plan view of FIG. 14; and FIG. 16 is a side view.

FIG. 17 is a partial plan view of a modification of the second embodiment of the bit, the head of which is provided with four inserts disposed according to the arms of a cross, each of the inserts being offset relative to the corresponding arm of the cross.

The drilling tool, in the first embodiment shown in FIGS. 1 to 3, comprises a bit having a body 1 in the shape of a truncated cone, adapted to be fixed on the end by threading for example, on rod 2. The head of the bit, constituted by the large base of the frustum of the cone, is provided with slots 3, disposed according to the arms of a cross, and inclined along a slope, the top of which lies on the axis of the bit. The central part of the head of the bit has a circular recess 4, into the bottom of which a duct 5 discharges compressed air.

Into the bottom of each of the four cross slots 3 is one end of a tapered bore 7 communicating with the threaded end of pipe 2. The axis of each of the bores 7 is perpendicular to the inclined bottom of the corresponding slot 3.

The slot 3 and the corresponding bore 6 are adapted to receive a cutter insert 8, of oblong shape, the rectilinear edge 9 of which is parallel to the base surfaces of the cone frustum of the bit 1 and situated in the symmetry axis of the side walls of the slot 3, each of said walls serving as a guide for the corresponding flank 10 of the insert. The base of each of the inserts 8 is constituted by a rod 11, in the shape of a truncated cone, adapted to be inserted in the recess 7 of the same cross section of the bit 1. The lower end of the rod 11 is provided with a cup 12 against which may bear the pointed end of a punch, not shown in the drawing, the said punch, inserted in the central recess 4 and in the truncated recess 7, being adapted to drive the insert out of its housing.

Between two adjacent grooves 3, the periphery of the bit is provided with a longitudinal groove 13 for the discharge of drilling waste.

In a modification of the embodiment described, shown in FIGS. 4 to 6, the head of a bit 14 is provided with guiding slots 15, disposed more or less in the form of a cross, so that each of said slots, forming the seat of an insert 16, is directed obliquely with respect to the corresponding arm of the said cross, the inclined axis of the truncated recess 17 adapted to receive the rod of the bit being placed in the plane of the corresponding arm of the said cross. The lower part of each of the recesses 17, issuing into the bottom of the central recess 18 of the bit 14, forms a slight bend directed towards the axis of the bit so as not to encroach to an undue extent on the threading of the said recess 18.

In the said modification, the cutting edge 19 of each of the inserts 16 is parallel to the slope of the conical head of the bit 14, the faces of the said cutting edge being asymmetrical. The central part 20 of the head of the bit is, moreover, recessed in the shape of a funnel. Finally, as a result of the offsetting of the orientation of the slots 15, the bit has asymmetrical thickness on the flanks of each of the slots, so as to offer a uniform resistance of the material surrounding the corresponding truncated recess 17, adapted to fix the rod of the insert 16.

The drilling tool, in a second embodiment shown in FIGS. 7 to 9, comprises a bit 21 of ogival cross section, provided on its periphery with projecting ribs 22, the said ribs forming a six-armed star. Each of the ribs 22, of decreasing cross section in the direction of the head of the bit, is provided on its upper part with flat surfaces 23 disposed in sloping tiers. Each of the surfaces 23 is adapted to serve as a seat for an insert 24; the rod 25 which is of truncated shape, is housed in a recess 26 of the same cross section, formed in the rib 22 and, following the location of the flat surface 23, in the bit 21.

The insert 24 (FIGS. 10 to 13) comprises a rectilinear edge 27, out of the center with respect to the axis of the rod 25, the rear face 28 of the said edge terminating in a flank 29, adapted to contact a slot 30 (FIGS. 7 to 9) provided on each of the ribs 22 on the inner edge of the flat surface 23. The lower end of the rod 25 is provided, as in the case of the previously described inserts, with a cup 32, against which may bear, when the insert is withdrawn, the point of a punch inserted in one of the recesses 26 of the rib 22 or of the bit 21, according to the location of the insert.

The head 33 of the bit 21, of a general conical shape, is provided with a slot 34, adapted to house an insert 35 (FIGS. 14 to 16), of trapezoidal shape, the longitudinal flanks 36 and front and rear faces 37 and 37' of which converge respectively in the direction of the base of the insert, the lower part 38 of the said faces having, for example, a semi-circular cross section.

The bit 21 is further provided with ducts 5' for blowing air, their upper ends issuing in the ogival part of the bit between the ribs 22, and their lower ends in the central recess 39 of the said bit.

In a modification of the second embodiment, shown in FIG. 17, the head 40 of the bit is provided with four inserts 16, the said inserts having the same shape and same offset arrangement, with their guiding slots 15 as those shown in FIGS. 4 to 6.

The head 40 of the bit could also be provided with four guiding slots 15 respectively disposed in the form of a cross, each of said slots being adapted to receive an insert 16 as previously described.

In the embodiment shown in FIG. 17, it will be seen that the inserts secured to the bit are all of the same shape, so that they are interchangeable and that each of said inserts may be housed in any one of the recesses of the bit provided for this purpose.

In the embodiments and modifications described, the inserts are inserted in their respective housings by wedging in their truncated rods, without soldering.

If, as a result of wear, in insert slackens in its housing, a foil leaf may, for example, be interposed between the rod of the insert and the recess of the bit in which it is gripped, so as to restore the insert to its normal operating position.

It is to be understood that the bit, instead of being screwed on the chisel rod, may comprise a truncated central recess so that it may be fitted on the conical end of the chisel. Furthermore, the cutting edges of the described inserts, instead of being rectilinear, may have a rounded shape.

I claim:
1. In a rock drilling tool, a bit comprising a body having a plurality of downwardly tapering ribs projecting radially outwardly from the periphery thereof, said ribs having a plurality of inclined stepped flat surfaces forming seats thereon, said ribs provided with a plurality of tapered conical bores open at each end and obliquely disposed relative to the longitudinal axis of said bit, one end of each of said bores communicating with a related seat, said body also having an internally threaded opening at its inner end and a centrally disposed seat at its outer end and disposed transversely thereof, a cutter of generally trapezoidal shape removably secured in said seat, a plurality of removable and interchangeable cutters each having a head and a tapered conical shank depending therefrom, the shank of said cutter fitted in a related bore and the cutter head resting on a related seat, at least one edge of said head abutting an adjacent edge of said seat to resist rotation during the drilling operation, and a plurality of air ducts communicating with the internally threaded opening in said body and the outer wall of said body in an area between said ribs.

2. In a rock drilling tool, a bit comprising a body having a plurality of ribs projecting radially outwardly from the periphery thereof, said ribs having a plurality of inclined stepped flat surfaces forming seats thereon, said ribs provided with a plurality of tapered conical bores open at each end and obliquely disposed relative to the longitudinal axis of said bit, one end of each of said bores communicating with a related seat, said body also having an internally threaded opening at its inner end, a plurality of radial seats at its outer end and a tapered conical bore communicating with each of said seats, a plurality of removable and interchangeable cutters each having a head and a tapered conical shank depending therefrom, the shank of said cutter fitted in a related bore and the cutter head resting on a related seat, at least one edge of said head abutting an adjacent edge of said seat to resist rotation during the drilling operation, and a plurality of air ducts communicating with the internally threaded opening in said body and the outer wall of said body in an area between said ribs.

References Cited in the file of this patent
UNITED STATES PATENTS

| 2,040,263 | Layne et al. | May 12, 1936 |
| 2,061,657 | Howard | Nov. 24, 1936 |
| 2,502,128 | Curtis | Mar. 28, 1950 |
| 2,815,933 | Dionisotti | Dec. 10, 1957 |
| 2,897,973 | Saxman | Mar. 31, 1959 |
| 2,960,312 | Kandle | Nov. 15, 1960 |

FOREIGN PATENTS

| 14,637 | Great Britain | of 1913 |